United States Patent Office 3,484,454
Patented Dec. 16, 1969

3,484,454
TETRAHALOGENO ISOINDOLINE PIGMENTS
André Pugin, Riehen, Kurt E. Burdeska, Basel, and Alfred Staub, Binningen, Basel-Land, Switzerland, assignors to J. R. Geigy A.G., Basel, Switzerland
No Drawing. Continuation-in-part of application Ser. No. 451,606, Apr. 28, 1965. This application Mar. 22, 1968, Ser. No. 715,137
Claims priority, application Switzerland, Apr. 30, 1964, 5,665/64
Int. Cl. C09b 57/00; C07d 27/48; C08g 51/14
U.S. Cl. 260—326.1
6 Claims

ABSTRACT OF THE DISCLOSURE

Pigments of the formula

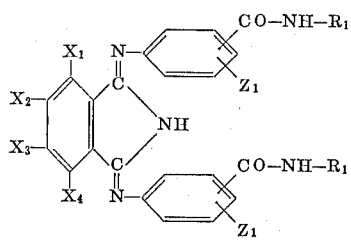

wherein each of $X_1$, $X_2$, $X_3$ and $X_4$ is a member selected from the group consisting of chlorine and bromine, $R_1$ represents hydrogen, lower alkyl or an aryl radical, especially a phenyl or a naphthyl radical, and $Z_1$ represents hydrogen, one or two chlorine or lower alkoxy, or one bromine, lower alkyl or an optionally substituted carbamoyl group, are disclosed which are useful for coloring high molecular weight organic materials; the colored products possess good light fastness and very good fastness to cross lacquering and to migration.

---

This application is a continuation-in-part of our copending patent application Ser. No. 451,606 filed Apr. 28, 1965, now U.S. Patent No. 3,385,864.

DETAILED DISCLOSURE

The present invention concerns new pigments for coloring high molecular organic products. The invention also concerns, as industrial product, the colored high molecular, organic material.

"High molecular organic substances" which can be pigmented according to the invention and which are understood by this term as used in this specification can be of natural or synthetic origin and are, in particular, natural resins, drying oils or rubber, furthermore modified natural substances, e.g. chlorinated rubber, oil-modified alkyd resins or cellulose derivatives such as viscose, acetyl cellulose and nitrocellulose and, particularly, completely synthetic organic polymeric materials, i.e. plastics produced by polymerization, polycondensation and polyaddition. The following can be named in particular from this class of plastics: polyethylene, polypropylene, polystyrene, polyvinyl chloride, polyvinyl acetate, polyacrylonitrile, polyacrylic acid ester and polymethacrylic acid ester; polyesters, in particular high molecular esters of aromatic polycarboxylic acids with polyfunctional alcohols; polyamides; the condensation products of formaldehyde with phenols, the phenolic resins, and the condensation products of formaldehyde with urea, thiourea and melamine, the so-called amino plastics; the polyesters used as lacquer resins, both saturated such as alkyd resins as well as unsaturated such as maleinate resins, and also the polyaddition or polycondensation products of epichlorohydrin with diols or polyphenols known by the name of "epoxy resins"; in addition the so-called thermoplastics, i.e. polymeric materials which cannot be cured. Not only the uniform compounds but also mixtures of polymeric materials as well as mixed condensates and mixed polymers such as those based on butadiene can be pigmented according to the invention.

The pigmenting of such high molecular organic substances with 1,3-bis-arylimino-isoindolines the arylimino groups of which are derived from certain heterocyclic amines namely benzothiazoles, benzoxazoles and benzimidazoles, is known. But the color strength and the fastness properties of these pigmentations, in particular the fastness to solvents, cross lacquering, migration and light are not up to present day standards. Also these 1,3-bis-arylimino-isoindolines having a heterocyclic aryl radical have the disadvantage that on trituration with zinc oxide they undergo a noticeable change in shade which change is proportional to the length of the trituration. These undesirable properties are also present in the case of using pigments obtained from those of the above-mentioned class by halogenation in the 4-, 5-, 6- and 7-position of the isoindoline ring.

Furthermore, it has been found that the 1,3-bis-phenyl-imino-isoindolines used as intermediate products for the synthesis of phthalocyanine dyestuffs, the benzo radical of the isoindoline ring of which is unsubstituted, suffer from drawbacks which make them unsuited as pigments; in particular they lack fastness to light and solvents and possess only slight color strength, even if the phenylimino groups thereof bear nonionogenic ring substituents. Their color strength is even lower than that of the 1,3-bis-arylimino-iso-indolines containing heterocyclic arylimino groups.

It could be concluded from these facts that the pigmentings of high molecular organic substances with 4,5,6,7-tetrahalogen-1,3-bis-phenylimino-isoindolines the phenyl radicals of which are neither non-ionogenically substituted nor condensed, would have hardly better properties than pigmentings with such compounds the benzo radical of the isoindoline ring of which is not halogenated.

It has now been found that contrary to this expectation high molecular organic products can be pigmented with surprising fastness and color strength by incorporating into the same a colored compound of the formula

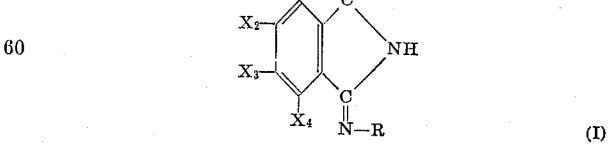

(I)

wherein each of $X_1$, $X_2$, $X_3$ and $X_4$ represents chlorine or bromine and R represents an unsubstituted, a non-ionogenically substituted or a condensed phenyl radical.

The tautomeric Formula Ia can also be assigned to the compounds of the Formula I and all formulae analogous to Formula I are to be understood as including the tautomers analogous to Formula Ia:

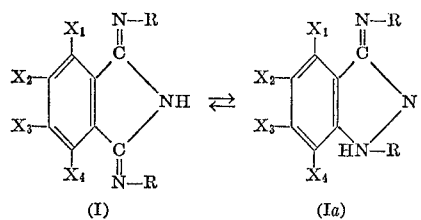

(I)  (Ia)

If R in Formula I is a non-ionogenically substituted phenyl radical then examples of substituents are: halogens such as fluorine, chlorine or bromine; lower alkyl groups such as the methyl, ethyl or butyl group; aryl groups such as the phenyl group and non-ionogenically substituted phenyl groups; lower alkoxy groups, e.g. the methoxy, ethoxy or butoxy group; aralkoxy groups such as the benzyloxy group, or aryloxy groups such as the phenoxy, methylphenoxy or halogenphenoxy groups; sulphonic acid amide and carboxylic acid amide groups optionally substituted at the nitrogen atom, which nitrogen substituents may be aliphatic groups, in particular lower alkyl, hydroxyalkyl, halogenalkyl or cyanoalkyl groups, cycloaliphatic, araliphatic or aromatic groups; also sulfonic acid aryl ester, particularly phenyl ester or cresyl ester groups; carboxylic acid ester groups; acyl groups, i.e. carbacyl groups, e.g. lower alkanoyl groups such as the acetyl or propionyl group, aroyl groups such as the benzoyl, methylbenzoyl and chlorobenzoyl groups; alkylsulfonyl groups such as the methylsulfonyl, ethylsufonyl or butylsulfonyl group, or arylsulfonyl groups such as the phenylsulfonyl, methylphenylsulfonyl or chorophenylsulfonyl group; acylamido, particularly carbacylamido, alkoxycarbonylamido, cycloalkoxycarbonylamido, aralkoxycarbonylamido or optionally nitrogen-substituted carbamoylamino groups or dicarboxylic acid imido groups and, finally, the cyano or trifluoromethyl group.

Mainly, aroylamido groups are used as carbacylamido groups, i.e., for example, benzoylamido or naphthoyl-(1 or 2)-amido groups the rings of which can be non-ionogenically substituted, e.g. by halogen, lower alkyl or lower alkoxy groups. The methoxy- and ethoxy-carbonylamido groups are mentioned as alkoxycarbonylamido groups, the cyclohexyloxycarbonylamido group is mentioned as cycloalkoxy-carbonylamido group, and, as example of aralkoxycarbonylamido groups, the benzyloxycarbonylamido group is mentioned. Nitrogen-substituted carbamoylamino groups preferably correspond to the formula —NH—CO—NH—R′ wherein R′ is an aromatic group, mainly a phenyl radical optionally substituted by halogen, lower alkoxy or alkyl groups. Dicarboxylic acid imido groups are derived from e.g. succinic acid, phthalic acid, chlorinated phthalic acid, hexahydrophthalic acid, 1,4-endomethylene-hexahydrophthalic acid, naphthalic acid or from pyridine dicarboxylic acid.

If R is a condensed phenyl radical, then the aminobenzo component can complete both carbocyclic as well as heterocyclic structures.

Preferably both R's are identical non-ionogenically substituted phenyl radicals. The expression "non-ionogenically substituted," whenever appearing in the invention description is used to designate that compounds or radicals are substituted by groups which do not dissociate acid in neutral water.

Isoindoline pigments according to the invention which are distinguished by affording especially in natural and synthetic polymeric resin materials pigmentings of good light fastness and very good fastness to cross lacquering and to migration, comprise the compounds of Formula I in which R is a carbamoylphenyl-radical of the formula

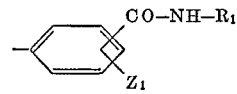

wherein $R_1$ represents hydrogen, lower alkyl, or an aryl radical which is either naphthyl, halogenonaphthyl or an optionally substituted phenyl radical any substituents of which are selected from the group consisting of hydrogen, chlorine, bromine, lower alkyl, lower alkoxy, lower alkanoylamino, benzoylamino, chlorobenzoylamino, bromobenzoylamino, lower alkyl-benzoylamino and lower alkoxy-benzoylamino; and $Z_1$ represents hydrogen, one or two chlorine or lower alkoxy, or one bromine, lower alkyl, carbamoyl, or an N-phenyl-carbamoyl radical any substituents of which at the phenyl moiety are selected from chlorine, bromine, lower alkyl and lower alkoxy.

4,5,6,7-tetrahalogen-isoindolines usable according to the invention and falling under Formula I wherein R is a non-ionogenically substituted or condensed phenyl radical and $X_1$, $X_2$, $X_3$ and $X_4$ each represents chlorine or bromine, are obtained by reacting a compound of the formula

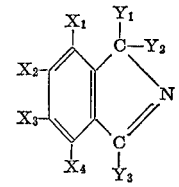

(II)

wherein each of $Y_1$, $Y_2$ and $Y_3$ represents a monovalent reactive substituent and $Y_1$ and $Y_2$ together also represent a divalent reactive substituent and $X_1$, $X_2$, $X_3$ and $X_4$ have the meanings given in Formula I, with two equivalents of a non-ionogenically substituted or condensed primary phenylamine.

As monovalent reactive substituents, $Y_1$, $Y_2$ and $Y_3$ each preferably represents chlorine, an etherified hydroxy group, for instance an alkoxy group such as methoxy or ethoxy group, or an aryloxy group, such as phenoxy, methylphenoxy or chlorophenoxy group, or a tertiary amino group, in which case, preferably the morpholino group.

If $Y_1$ and $Y_2$ together represent a divalent reactive substituent then this is preferably an imino group of the formula =N—R′; in this case $Y_3$ is advantageously an amino group of the formula —NH—R′. In these formulae, R′ represents hydrogen or an alkyl group optionally containing non-ionogenic substituents, e.g. the methyl, ethyl, butyl, γ-methoxypropyl or β-hydroxyethyl group; preferably R′ is hydrogen. As indicated above, isoindolines of this type can occur in tautomeric form; the tautomeric structures are also embraced by the drawing of a structural formula.

Starting materials of Formula II wherein $Y_1$, $Y_2$ and $Y_3$ each represents chlorine are obtained by reacting tetrachloro- or tetrabromophthalimide with phosphorus pentachloride; if tetrabromophthalimide is used, then individual bromine atoms can be exchanged for chlorine atoms. By reacting this 1,3,3-trichloro-isoindoline compound of Formula II with an alkali metal alcoholate or phenolate or with a secondary amine, starting materials of the Formula II are obtained wherein $Y_1$, $Y_2$ and $Y_3$ each represents an etherified hydroxy group or tertiary amino group. If a 1,3,3-trichloro-isoindoline compound of Formula II is reacted with an amine of the formula R'—NH₂, then starting materials of Formula II are obtained wherein $Y_1$ and $Y_2$ together represent the imino group of the formula =N—R' and $Y_3$ represents the amino group of the formula —NH—R'.

The reaction of non-ionogenically substituted or condensed primary phenylamines with a compound of Formula II wherein each of $Y_1$, $Y_2$ and $Y_3$ is chlorine, is preferably performed by heating the two starting substances in the absence of compounds containing hydroxyl groups, advantageously to temperatures of 50 to 250° C., whereby generally the hydrogen chloride which is split off is released from the reaction mixture. Advantageously the reaction partners are reacted in an inert solvent, e.g. in an optionally halogenated or nitrated hydrocarbon. Instead of allowing the hydrogen chloride to escape, it can be bound with suitable acid binding agents, e.g. by means of an excess of the phenylamine to be reacted or by means of a tertiary amine such as triethylamine, N,N-diethylaniline or pyridine; in this case the reaction can be performed at room temperature. The word "low" as used in this specification and in the appended claims in connection with "alkyl" and "alkoxy" means that those radicals have from 1 to 5 carbon atoms, in connection with "alkanoyl" it means a radical of from 2 to 5 carbon atoms.

The reaction of a non-ionogenically substituted or condensed primary phenylamine with a compound of Formula II wherein $Y_1$ and $Y_2$ together are =N—R', preferably =NH, and $Y_3$ is —NH—R', especially —NH₂, is advantageously performed by heating the reaction partners in an organic solvent. As organic solvents, optionally halogenated or nitrated aromatic hydrocarbons, higher boiling alcohols, e.g. benzyl alcohol or ethylene glycol and its monoether can be used; particularly suitable solvents are fatty acids such as glacial acetic acid.

Compounds of Formula II wherein each of $Y_1$, $Y_2$ and $Y_3$ is an etherified hydroxy group or tertiary amino group are advantageously reacted with the non-ionogenically substituted or condensed phenylamine in the presence of an organic acid, especially in acetic acid. This reaction occurs even in water.

In all these modifications of the process, the crude pigments generally precipitate while the reaction mixture is hot and, by filtering off and, optionally, by washing with organic solvents, they can be isolated in a pure form suitable for analysis.

In general, the pigments usable according to the invention have good texture and in most cases can be used as crude products. If necessary or desirable, the crude products can be converted by milling or kneading into a finely dispersed form. For this purpose, advantageously milling auxiliaries are used such as inorganic and/or organic salts in the presence or absence of organic solvents. Often, an improvement of the properties can also be attained by heating the crude pigments in hot organic solvents. After milling, the auxiliaries are removed in the usual way, soluble inorganic salts, e.g. with water, and water-insoluble organic auxiliaries, e.g. by steam distillation.

Pigments usable according to the invention are particularly suitable for the colouring of vinyl, polyolefin and styrene polymers such as polymeric materials, and so-called film formers or binders known as crude materials for lacquers, particularly linseed oil varnish, nitrocellulose, alkyd resins, melamine resins and urea-formaldehyde resins. The high molecular organic substances are pigmented with the pigments of Formula I, for example, by mixing such a pigment, optionally in the form of master batches, with these substrates using sets of mixing rollers, mixing or milling apparatus. The pigmented material is then made into the desired final form by the usual known processes such as calendering, pressing, extrusion, spreading, pouring or injection moulding. To produce non-rigid articles or to reduce their brittleness, it is often desirable to incorporate so-called plasticisers into the high molecular compounds before forming. Esters of phosphoric acid, phthalic acid or sebacic acid, for example, can serve as such. The plasticiser can be incorporated into the polymeric materials before or after incorporation of the pigment dyestuff in the process according to the invention. To attain various shades, it is also possible to add fillers or other colour-imparting components such as white coloured or black pigments, in any amounts desired, to the high molecular organic substances in addition to the compounds of Formula I.

To pigment lacquers and printing inks, the high molecular organic materials and the compounds of Formula I, optionally together with additives such as fillers, other pigments, siccatives or plasticisers, are finely dispersed or dissolved in a common organic solvent or mixture of solvents. This can be done by dispersing or dissolving the individual components separately or dispersing or dissolving several of them together and then bringing all components together.

High molecular organic materials pigmented according to the invention generally contain amounts of 0.001 to 30% by weight of a compound of Formula I, calculated on the high molecular organic substance to be pigmented; polymeric materials and lacquers preferably contain 0.1 to 5% by weight, printing inks preferably contain 10 to 30% by weight. The amount of pigment to be chosen depends in the first place on the desired colour strength, then on the thickness of the article and finally, on any content of white pigment there may be in the polymeric material.

High molecular organic substances pigmented according to the invention have very fast greenish yellow, yellow, reddish yellow or yellowish red shades; also the fastness properties in use are generally very good.

The following non-limitative examples illustrate the invention further. The temperatures are given therein in degrees centigrade. Percentages are given by weight unless expressly stated otherwise.

EXAMPLE 1

6.9 g. of 1,3,3-trimethoxy-4,5,6,7-tetrachloroisoindolenine and 11.24 g. of 2-chloro-5-aminobenzoic acid-(4'-chloro-phenylamide) in 270 g. of glacial acetic acid are boiled for 5 minutes. The yellow dyestuff which precipitates is filtered off while still hot and washed first with ethanol then with acetone and dried.

In this way 15.6 g. of a greenish yellow pigment of the formula given below are obtained. It has very good fastness to cross lacquering, migration and light.

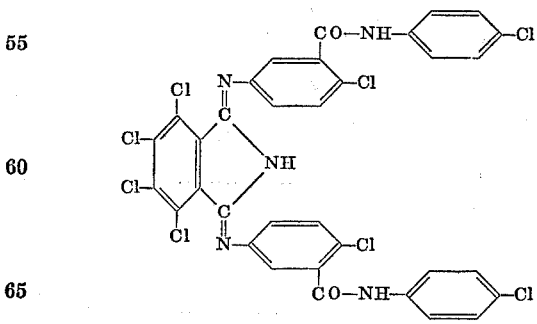

The same pigment is obtained if, instead of 6.9 g. of 1,3,3-trimethoxy-4,5,6,7-tetrachloroisoindolenine, 10.2 g. of 1,3,3 - trimorpholino-4,5,6,7-tetrachloroisoindolenine, 5.6 g. of 1-amino-3-imino-4,5,6,7-tetrachloroisoindolenine or 6.2 g. of 1-methylamino-3-methylimino-4,5,6,7-tetrachloroisoindolenine are used.

If the 11.24 g. of 2-chloro-5-aminobenzoic acid-(4'-chlorophenylamide) are replaced by equimolar amounts of one of the amines given in the following Table I, in column II, then with otherwise the same procedure, similar fast pigments having the shades given in column III are obtained.

TABLE I

| I<br>Expl. No. | II<br>Amine | III<br>Shade of print on paper |
|---|---|---|
| 2 | 4-amino-2-chloro-benzamide (NH$_2$, Cl, —CO—NH$_2$) | Greenish yellow. |
| 3 | 4-amino-2-chloro-N-phenyl-benzamide | Do. |
| 4 | 4-amino-2-chloro-N-(2,4-dichlorophenyl)-benzamide | Do. |
| 5 | 4-amino-2-chloro-N-(2,5-dichlorophenyl)-benzamide | Do. |
| 6 | 4-amino-2-chloro-N-(2,4,5-trichlorophenyl)-benzamide | Do. |
| 7 | 4-amino-2-chloro-N-(4-methylphenyl)-benzamide | Do. |
| 8 | 4-amino-2-chloro-N-(4-methoxyphenyl)-benzamide | Do. |
| 9 | 4-amino-2-chloro-N-(4-acetylaminophenyl)-benzamide | Do. |
| 10 | 4-amino-2-chloro-N-(4-benzoylaminophenyl)-benzamide | Yellow. |
| 11 | 4-amino-2-chloro-N-[4-(4-chlorobenzoylamino)phenyl]-benzamide | Do. |
| 12 | 4-amino-2-chloro-N-[4-(4-bromobenzoylamino)phenyl]-benzamide | Do. |
| 13 | 4-amino-2-chloro-N-[4-(2-methylbenzoylamino)phenyl]-benzamide | Do. |
| 14 | 4-amino-N-[4-(4-methoxybenzoylamino)phenyl]-2-chloro-benzamide | Do. |

EXAMPLE 15

15.3 g. of 1,3,3-trimorpholino-4,5,6,7-tetrachloroisoindolenine and 12.3 g. of 2,4-dichloro-5-aminobenzoic acid amide are boiled while stirring well in 350 g. of glacial acetic acid. The condensation is completed after 10 minutes. The precipitated yellow dyestuff is filtered off at 100° and washed first with ethanol and then with acetone and dried. The yield is 18.7 g. The greenish yellow pigment of the formula given below has very good fastness to migration, cross lacquering and light.

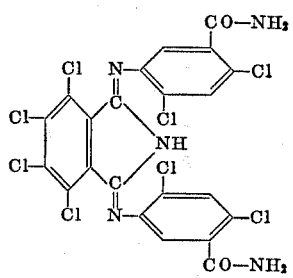

EXAMPLE 16

10.74 g. of 1,3,3,4,5,6,7-heptachloroisoindolenine and 12.3 g. of 2,4-dichloro-5-aminobenzoic acid amide are boiled for 35 minutes in 330 g. of chlorobenzene. The precipitated dyestuff is filtered off at 100° and washed first with ethanol and then with acetone and dried. The yield is 17 g. the greenish yellow pigment is identical with that described in Example 15.

EXAMPLE 17

5.6 g. of 1-amino-3-imino-4,5,6,7-tetrachloro-isoindolenine and 14 g. of 3-amino-4-chlorobenzoic acid-(2',4',5'-trichlorophenylamide) are boiled for 45 minutes in 250 g. of glacial acetic acid. The precipitated yellow dyestuff of the formula given below is filtered off while still hot and washed with ethanol and then with acetone and dried. The yield is 15.5 g. The greenish yellow pigment has similarly good fastness properties to that described in Example 1.

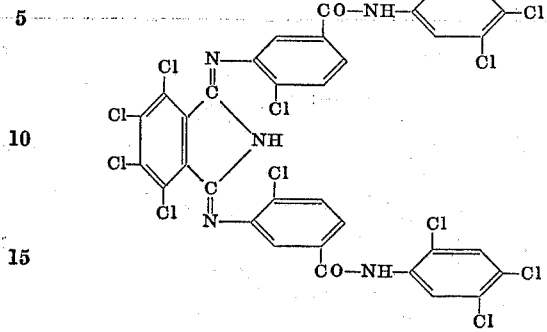

EXAMPLE 18

10.35 g. of 1,3,3-trimethoxy-4,5,6,7-tetrachloro-isoindolenine and 8.2 g. of 3-aminobenzoic acid amide are suspended in 260 g. of glacial acetic acid and boiled for 10 minutes while stirring well. A colourless solution is first formed which, on heating, quickly turns yellow. The pigment begins to precipitate in crystalline form at 60–70°. It is kept at the boil for 5 minutes and then filtered off at boiling temperature. The yellow pigment is washed with alcohol and then with acetone and dried. The yield is 15 g. The pigment, which has very good fastness to cross lacquering, migration and light, corresponds to the formula

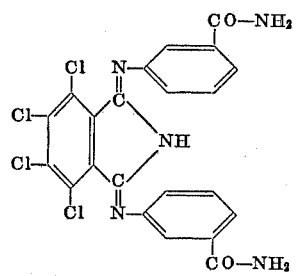

Pigments having similarly good fastness properties are obtained if the 3-aminobenzoic acid amide mentioned in the example are replaced by equimolar amounts of one of the amines given in Table II, column II. The colour of the prints on paper are given in column III.

TABLE II

| I Example No. | II Amine | III Shade of print on paper |
|---|---|---|
| 19 | Cl—C₆H₃(NH₂)—CO—NH₂ | Greenish yellow |
| 20 | Cl—C₆H₃(NH₂)—CO—NH—C₆H₄—Cl | Do. |
| 21 | Cl—C₆H₃(NH₂)—CO—NH—C₆H₃(Cl)—Cl | Do. |
| 22 | Cl—C₆H₃(NH₂)—CO—NH—C₆H₃(CH₃)—Cl | Do. |
| 23 | Cl—C₆H₃(NH₂)—CO—NH—C₆H₄—OCH₃ | Do. |

TABLE II—Continued

| Example No. | Amine | Shade of print on paper |
|---|---|---|
| 24 | 4-amino-3-chloro-benzoic acid p-toluidide | Greenish yellow. |
| 25 | 4-amino-3-chloro-benzoic acid 2-naphthylamide | Reddish yellow. |
| 26 | 4-amino-3-chloro-benzoic acid (1,4-dichloro-2-naphthyl)amide | Do. |
| 27 | 4-amino-3,5-dichloro-benzimidic acid methylamide | Do. |
| 28 | 4-amino-3,5-dichloro-benzoic acid 4-chloroanilide | |
| 29 | 4-amino-benzoic acid anilide | Greenish yellow. |
| 30 | 4-amino-isophthalic acid diamide | Do. |
| 31 | 4-amino-benzoic acid 2,4-dichloroanilide | Do. |
| 32 | 4-amino-3-methoxy-benzoic acid anilide | Reddish yellow. |
| 33 | 4-amino-3-methoxy-benzoic acid 2,4-dichloroanilide | Do. |
| 34 | 4-amino-3-methoxy-benzamide | Do. |
| 35 | 4-amino-3-methoxy-benzamide (other isomer) | Do. |
| 36 | 4-amino-2-chloro-benzamide | Greenish yellow. |
| 37 | 4-amino-2-chloro-benzoic acid 4-chloroanilide | Do. |
| 38 | 4-amino-3-methyl-benzamide | Reddish yellow. |

TABLE II—Continued

| I Example No. | II Amine | III Shade of print on paper |
|---|---|---|
| 39 | 4-amino-3-methylbenzamide (NH₂, CH₃, CO—NH₂) | Reddish Yellow |
| 40 | 4-amino-3-methyl-N-(2,4-dichlorophenyl)benzamide | Do. |
| 41 | 3-amino-4,6-dimethoxybenzamide | Yellowish red. |
| 42 | 4-aminobenzamide (NH₂—C₆H₄—CO—NH₂) | Do. |
| 43 | 4-amino-N-(2,4,5-trichlorophenyl)benzamide | Do. |
| 44 | 2-aminobenzamide | Do. |
| 45 | 2-amino-N-(4-chlorophenyl)benzamide | Do. |
| 46 | 4-amino-N-(2,4-dibromophenyl)benzamide | Reddish yellow. |
| 47 | 3-amino-4-bromo-N-phenylbenzamide | Yellow. |
| 48 | 5-amino-N,N'-diphenylisophthalamide | Do. |
| 49 | 5-amino-N,N'-bis(2,4-dichlorophenyl)isophthalamide | Do. |
| 50 | 5-amino-N,N'-bis(4-bromophenyl)isophthalamide | Do. |
| 51 | 5-amino-N,N'-bis(3-methoxyphenyl)isophthalamide | Do. |

TABLE II—Continued

| I | II | III |
|---|---|---|
| Example No. | Amine | Shade of print on paper |
| 52 | (structure: NH₂–phenyl with two CO–NH–xylyl (CH₃,CH₃) substituents) | Yellow |

EXAMPLE 53

5.47 g. of a 1,3,3-trichloro-4,5,6,7-tetrahalogeno-isoindolenine, the halogen atoms of which consist of a mixture of chlorine and bromine, and 4.08 g. of 2-chloro-5-aminobenzoic acid amide in 150 g. of glacial acetic acid are boiled for 5 minutes. The precipitated yellow dyestuff is filtered off, washed with ethanol and then with acetone and dried. 6.5 g. of a yellow pigment are so obtained which has very good fastness to light and solvents.

The 1,3,3-trichloro-4,5,6,7-tetrahalogenoisoindolenine is produced by reaction of tetrabromophthalimide and 2 mols of phosphorus pentachloride in boiling phosphorus oxychloride. In this way about 20% (molar) of the bromine atoms are replaced by chlorine atoms.

EXAMPLE 54

67 g. of polyvinyl chloride powder (suspension polymer), 33 g. of dioctyl phthalate, 2 g. of dibutyl tin dilaurate, 0.3 g. of a stabiliser based on phosphate and 0.7 g. of the pigment produced according to Example 1 by condensation of 1,3,3-trimethoxy-4,5,6,7-tetrachloroisoindolenine with 2-chloro-5-aminobenzoic acid-(4′-chlorophenylamide) are mixed and worked up on a set of hot mixing rollers for 15 minutes at 160°. A sheet of 0.4 mm. thickness is then produced on the calender. It is coloured pure greenish yellow. The colouring is stable to heat and fast to migration.

EXAMPLE 55

A finely milled paste consisting of 50 g. of polyvinyl chloride powder (emulsion polymer), 32 g. of dioctyl phthalate, 1 g. of dibutyl tin dilaurate, 0.25 g. of a stabiliser based on phosphate, 6 g. of chalk powder, 10.75 g. of mineral spirits and 2.5 g. of a finely milled 40% paste of the pigment, produced according to Example 1 by condensation of 1,3,3-trimethoxy-4,5,6,7-tetrachloroisoindolenine with 2-chloro-5-aminobenzoic acid-(4′-chlorophenylamide), in dioctyl phthalate is spread in a thickness of 0.2 mm. on cotton. The coated fabric is then heated for 3 minutes at 160° whereupon another coating of 0.3 mm. thickness is applied and the fabric is heated for another 3 minutes at 160°. Greenish yellow synthetic leather is obtained the colour of which has very good fastness to migration and also good fastness to rubbing and wet.

EXAMPLE 56

0.2 g. of the pigment produced according to Example 15 by condensation of 1,3,3-trimorpholino-4,5,6,7-tetrachloroisoindolenine and 2,4-dichloro-5-aminobenzoic acid amide, and 100 g. of polystyrene granulate are mixed and worked at 130° on a set of hot mixing rollers until the colouring appears to be homogeneous. The mass is then pressed into sheets between chromium plated plates at 150°. The greenish yellow colour of the sheets has good fastness to light. The pigmenting can also be done in the extruder instead of on the set of mixing rollers. It is also possible to granulate the homogeneously pigmented mass and to form it by injection moulding.

EXAMPLE 57

A rubber mixture consisting of 40 g. of Hevea Latex crepe, 24.5 g. of barium sulphate, 24.8 g. of chalk, 5.22 g. of lithopone, 4.0 g. of zinc oxide, 0.2 g. of paraffin, 0.7 g. of sulphur, 0.18 g. of vulcanising agent, 0.4 g. of an ager and 2 g. of the pigment obtained according to Example 5 by condensation of 1,3,3-trimethoxy-4,5,6,7-tetrachloroisoindolenine with 2-chloro-5-amionbenzoic acid-(2′,5′-dichlorophenylamide) are worked up in the usual way on a set of mixing rollers and vulcanised in the press for 10 minutes at 140°. A greenish yellow colouration is obtained which has good fastness to light and migration.

EXAMPLE 58

100 g. of a pulverulent formaldehyde/urea resin suitable for moulding materials, 10 g. of lithopone and 1 g. of the pigment produced according to Example 19 by condensing 1,3,3-trimethoxy-4,5,6,7-tetrachloroisoindolenine and 3-amino-4-chlorobenzoic acid amide, are milled in a bal lmill for 16 hours. The mass is then pressed into forms at 140–160°. The greenish yellow samples have good stability to light and heat.

We claim:

1. A compound of the formula

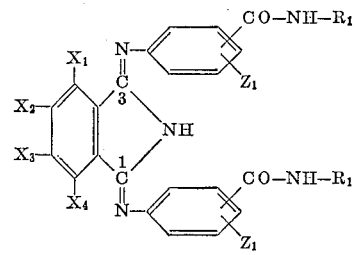

wherein each of $X_1$, $X_2$, $X_3$ and $X_4$ represents chlorine and bromine, $R_1$ represents hydrogen, lower alkyl, naphthyl, halogenonaphthyl or an optionally substituted phenyl radical any substituents of which are selected from hydrogen, chlorine, bromine, lower alkyl, lower alkoxy, lower alkanoylamino, benzoylamino, chlorobenzoylamino, bromobenzoylamino, lower alkylbenzoylamino and lower alkoxy-benzoylamino, and $Z_1$ is a member selected from the group consisting of hydrogen, one or two chlorine or lower alkoxy, one bromine, lower alkyl, carbamoyl, or an N-phenylcarbamoyl radical any substituents of which at the phenyl moiety are selected from chlorine, bromine, lower alkyl and lower alkoxy.

2. A pigment as defined in claim 1, wherein each $X_1$ through $X_4$ represents chlorine and each of the carbon atoms in 1- and 3-position of the isoindoline nucleus is substituted by the grouping

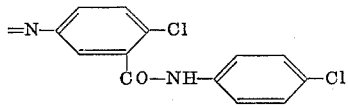

3. A pigment as defined in claim 1, wherein each $X_1$ through $X_4$ represents chlorine and each of the carbon atoms in 1- and 3-position of the isoindoline nucleus is substituted by the grouping

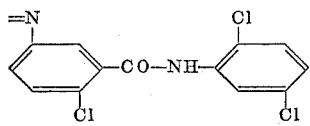

4. A pigment as defined in claim 1, wherein each $X_1$ through $X_4$ represents chlorine and each of the carbon atoms in 1- and 3-position of the isoindoline nucleus is substituted by the grouping

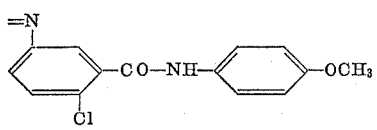

5. A pigment as defined in claim 1, wherein each $X_1$ through $X_4$ represents chlorine and each of the carbon atoms in 1- and 3-position of the isoindoline nucleus is substituted by the grouping

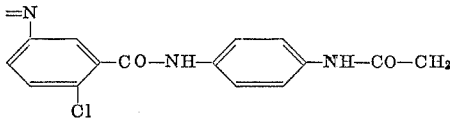

6. A pigment as defined in claim 1, wherein each $X_1$ through $X_4$ represents chlorine and each of the carbon atoms in 1- and 3-position of the isoindoline nucleus is substituted by the grouping

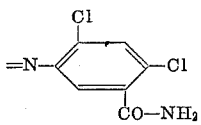

References Cited
UNITED STATES PATENTS 2,739,155  3/1956  Rosch et al. _____ 260—326.1

ALEX MAZEL, Primary Examiner

J. A. NARCAVAGE, Assistant Examiner

U.S. Cl. X.R.

106—23, 164, 241, 266; 260—37, 38, 39, 40, 41, 41.5, 239.6, 247.5, 295, 326, 314.5, 764